United States Patent [19]

Kamimura et al.

[11] Patent Number: 5,296,990
[45] Date of Patent: Mar. 22, 1994

[54] MAGNETIC HEAD ASSEMBLY FOR DOUBLE-SIDED DISK

[75] Inventors: Teruo Kamimura, Koide; Kazuyuki Sorimachi, Nagaoka, both of Japan

[73] Assignee: Alps Electric Co., Ltd., Tokyo, Japan

[21] Appl. No.: 971,790

[22] Filed: Nov. 5, 1992

[30] Foreign Application Priority Data

Nov. 13, 1991 [JP] Japan ................................. 3-325377

[51] Int. Cl.⁵ ................................................ G11B 5/23
[52] U.S. Cl. ..................................... 360/119; 360/104; 360/121; 360/122
[58] Field of Search ............... 360/119, 121, 103, 104, 360/122

[56] References Cited

U.S. PATENT DOCUMENTS

| | | | |
|---|---|---|---|
| 4,191,980 | 3/1980 | King et al. | 360/103 X |
| 4,912,582 | 3/1990 | Gomi et al. | 360/103 X |
| 4,933,795 | 6/1990 | Nigam | 360/121 |

Primary Examiner—John H. Wolff
Attorney, Agent, or Firm—Guy M. Shoup; Patrick T. Bever

[57] ABSTRACT

A magnetic head assembly having two magnetic heads for use on two sides of a magnetic head and arranged so as to use one common circuit to process signals from the two magnetic heads and so that the magnetic heads can be manufactured at a reduced cost. The magnetic heads are disposed on the two sides of the magnetic disk so that magnetic core blocks of the magnetic heads are located at different distances from the center of rotation of the magnetic disk. Recording/reproduction gaps of the magnetic core blocks are formed so that the depth of the recording/reproduction gap of the magnetic core block closer to the center of rotation of the magnetic disk is larger than the depth of the recording/reproduction gap of the other magnetic core block.

1 Claim, 3 Drawing Sheets

MAGNETIC HEAD ASSEMBLY FOR DOUBLE-SIDED DISK

BACKGROUND OF THE INVENTION

1. Background of the Invention

This invention relates to a magnetic head assembly arranged to magnetically record information on both obverse and reverse sides of a magnetic disk and to reproduce information therefrom.

2. Description of the Related Art

It is a well known that, in general, the recording density of a magnetic disk is higher at a track closer to the center of rotation of the magnetic disk and the recording wavelength is correspondingly reduced. For this reason, recording/reproduction magnetic characteristics are changed depending upon the track position during recording/reproduction on a magnetic disk. Resolution and overwrite characteristics among such magnetic characteristics are varied particularly largely.

In a double-side recording/reproduction type of magnetic disk drive unit, recording/reproduction cores of a pair of obverse-side and reverse-side magnetic heads are shifted from each other in the direction of distance from the center of rotation of a magnetic disk, i.e., in a direction perpendicular to the direction along tracks in order to avoid magnetic interference between the obverse-side and reverse-side magnetic heads at the time of recording or reproduction. Recording/reproduction characteristics of the obverse-side and reverse-side magnetic heads become different by this shift. In this situation, if one circuit is used to process each of signals from the two magnetic heads, constants of amplifiers or the like of the circuit cannot be adapted for both the magnetic heads. A problem of occurrence of a difference between reproduction output signals from the two magnetic heads is therefore encountered, so long as the magnetic heads have the same construction on the obverse and reverse sides of the magnetic disk.

Then, this problem may be solved by a method of increasing the gap of the recording/reproduction core closer to the center of rotation of the magnetic disk relative to the gap of the other recording/reproduction core to equalize the recording/reproduction magnetic characteristics of the obverse-side and reverse-side magnetic heads.

To manufacture two magnetic heads having different recording/reproduction core gaps for the purpose of solving this problem, however, two series of steps for forming such recording/reproduction core gaps are required in the magnetic head manufacturing process. Then, a new problem concerning the need for processing the different two magnetic heads in subsequent steps arises.

SUMMARY OF THE INVENTION

The present invention has been achieved to solve the above-described problem of the conventional art.

An object of the present invention is to provide a magnetic head assembly which is arranged to enable one circuit to process signals from two magnetic heads on obverse and reverse sides of a magnetic disk without causing any difference between reproduction output signals from the two magnetic heads, and whose two magnetic heads can be manufactured at a limited cost by a maximized number of common manufacturing steps.

To achieve this object, according to the present invention, there is provided a magnetic head assembly comprising a pair of magnetic heads respectively disposed on two sides of a magnetic disk, respective core blocks of the magnetic heads being set at different distances from the center of rotation of the magnetic disk, wherein recording/reproduction gaps of the pair of magnetic core blocks are formed so that the depth of the recording/reproduction gap of one of the magnetic core blocks closer to the center of rotation of the magnetic disk is larger than the depth of the recording/reproduction gap of the other magnetic core block.

In this magnetic head assembly, the recording/reproduction gap depth of one of the magnetic core blocks closer to the center of rotation of the magnetic disk is increased relative to the recording/reproduction gap depth of the other magnetic core block. The magnetic characteristics of the magnetic heads on the two sides of the magnetic disk can be thereby equalized. It is thereby possible to process signal from the two magnetic heads by a common circuit without causing any difference between reproduction output signals from the two magnetic heads. It is also possible to form the same magnetic head parts before the magnetic head surfaces to be opposed to the magnetic disk are ground. That is, the two magnetic heads can be manufactured by the same process if only the extent of grinding is changed.

DESCRIPTION OF THE PREFERRED EMBODIMENT

Figure 1:
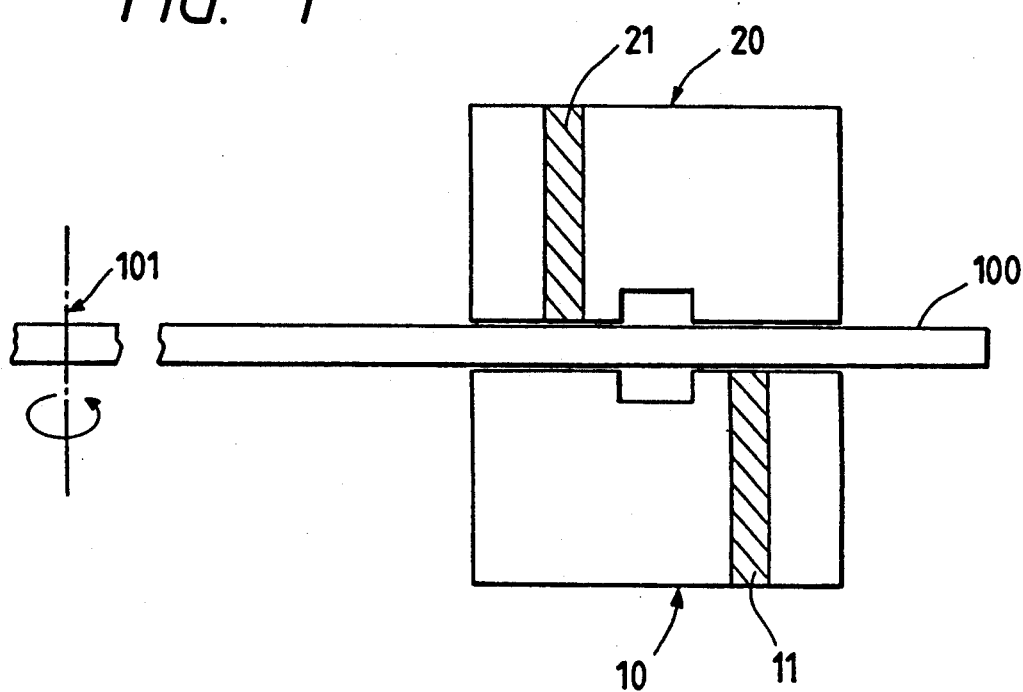
FIG. 1 is a schematic diagram of the basic construction of a magnetic head assembly and a magnetic disk in accordance with an embodiment of the present invention.

FIG. 1 schematically shows the basic construction of a magnetic head assembly and a magnetic disk 100 in accordance with an embodiment of the present invention. In the magnetic head assembly, a magnetic head 20 disposed on the obverse side of the magnetic disk 100 and a magnetic head 10 disposed on the reverse side of the magnetic disk 100 are integrally combined. However, members for integrally combining the magnetic heads 10 and 20 are not illustrated.

In FIG. 1, the center of rotation of the magnetic disk 100 is indicated at 101. A magnetic core block 21 of the magnetic head 20 on the obverse side of magnetic disk 100 is inwardly shifted relative to a magnetic core block 11 of the magnetic head on the reverse side of the magnetic disk 100 toward the rotation center 101.

Figure 2:
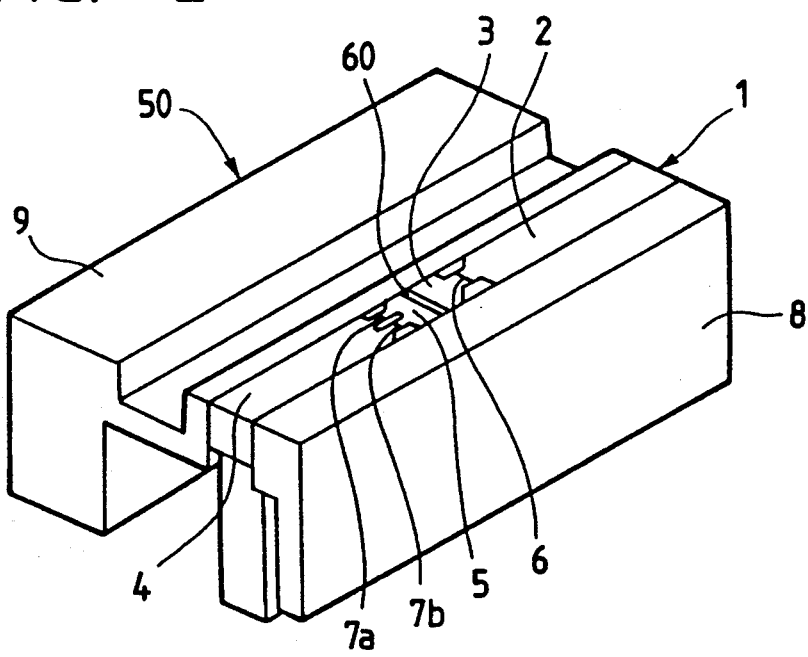
FIG. 2 is a perspective view of the basis construction of the magnetic heads shown in FIG. 1.

FIG. 2 is a perspective view showing a basic construction of the magnetic heads 10 and 20 shown in FIG. 1. A core block 1 of a magnetic head 50 is formed in the following manner. A recording/reproduction I core piece 3 and a recording/reproduction T core piece 2 are bonded by glass or the like with a recording/reproduction gap 6 formed therebetween, and an erasing I core pice 5 and an erasing T core pice 4 are bonded by glass or the like with erasing gaps 7a and 7b formed therebetween. To connect the two cores thereby formed, a surface of the recording/reproduction I core piece 3 opposite to a recording/reproduction gap 6 formation surface and a surface of the erasing I core 5 opposite to an erasing gap 7a, 7b formation surface are bonded to each other with a non-magnetic layer 60 interposed therebetween.

A slider 8 formed of a ceramic material or the like is bonded to one of opposite side surfaces of the magnetic core block 1 each facing in a direction of track width, and another slider 9 also formed of a ceramic material or the like is bonded to the other side surface of the magnetic core block 1, thus forming the magnetic head 50.

Figure 3:
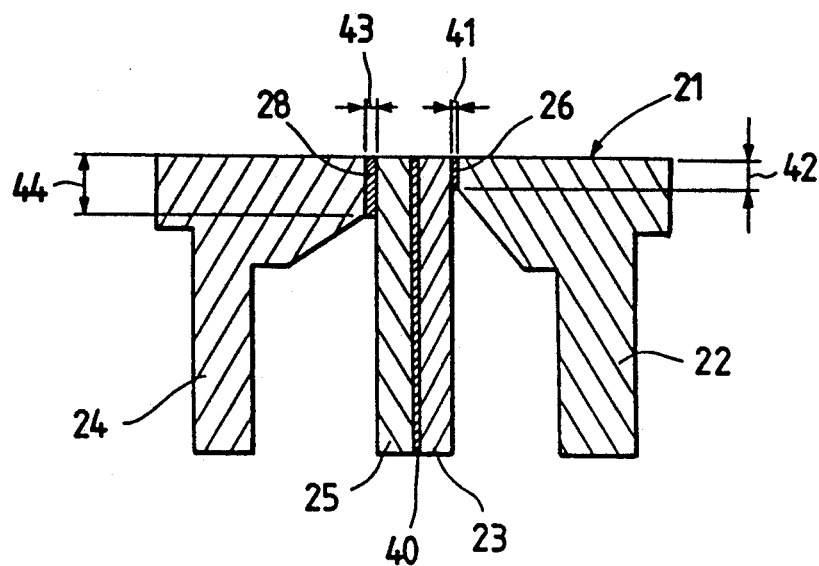
FIG. 3 is a crosss-sectional view of details of the construction of magnetic core block 21 shown in FIG. 1.
Figure 4:
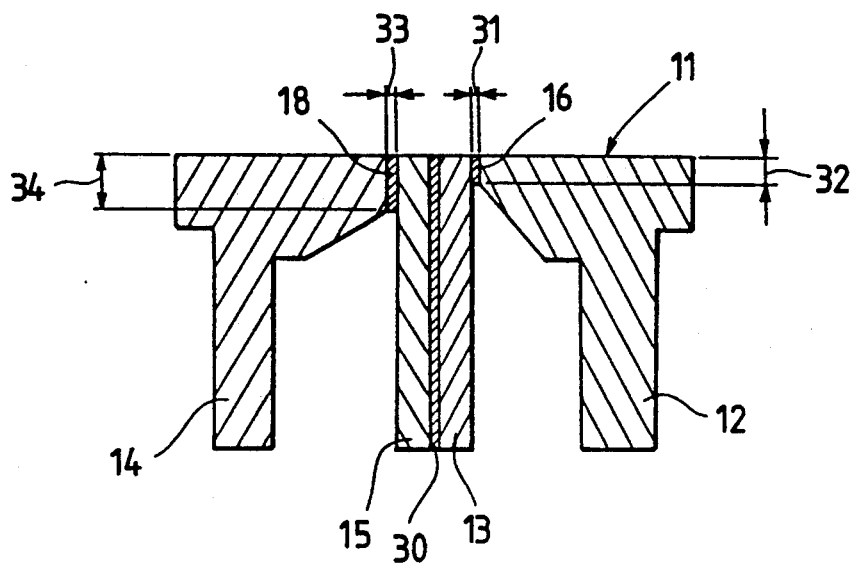
FIG. 4 is a crosss-sectional view of details of the construction of magnetic core block 11 shown in FIG. 1.

FIGS. 3 and 4 are cross-sectional views of details of the constructions of the magnetic core blocks 11 and 21 of the present invention shown in FIG. 1.

FIG. 3 shows details of the construction of the magnetic core block 21 of the magnetic head 20 on the obverse side of the magnetic disk 100. A recording/reproduction I core piece 23 and a recording/reproduction T core piece 22 are bonded by glass or the like with a recording/reproduction gap 26 formed therebetween, and an erasing I core piece 25 and an erasing T core piece 24 are bonded by glass or the like with an erasing gaps 28 formed therebetween. To connect the two cores thereby formed, a surface of the recording/reproduction I core piece 23 opposite to a recording/reproduction gap 26 formation surface and a surface of the erasing I core 25 opposite to an erasing gap 28 formation surface are bonded to each other with a non-magnetic layer 40 interposed therebetween.

The recording/reproduction gap 26 has a recording/reproduction gap distance 41 and a recording/reproduction gap depth 42 as fundamental construction factors, while the erasing gap 28 has an erasing gap distance 43 and an erasing gap depth 44 as fundamental construction factors.

FIG. 4 shows details of the construction of the magnetic core block 11 of the magnetic head 10 on the reverse side of the magnetic disk 100. A recording/reproduction I core piece 13 and a recording/reproduction T core piece 12 are bonded by glass or the like with a recording/reproduction gap 16 formed therebetween, and an erasing I core piece 15 and an erasing T core piece 14 are bonded by glass or the like with an erasing gaps 18 formed therebetween. To connect the two cores thereby formed, a surface of the recording/reproduction I core piece 13 opposite to a recording/reproduction gap 16 formation surface and a surface of the erasing I core 15 opposite to an erasing gap 18 formation surface are bonded to each other with a non-magnetic layer 30 interposed therebetween.

The recording/reproduction gap 16 has a recording/reproduction gap distance 31 and a recording/reproduction gap depth 32 as fundamental construction factors, while the erasing gap 18 has an erasing gap distance 33 and an erasing gap depth 34 as fundamental construction factors.

The magnetic core blocks 11 and 21 differ from each other in that the recording/reproduction gap depth 32 and the erasing gap depth 34 of the magnetic core block 11 are set to be smaller than the recording/reproduction gap depth 42 and the erasing gap depth 44 of the magnetic core block 21, respectively. In other respects, the constructions of the two core blocks are the same.

The magnetic heads 10 and 20 are manufactured as the same parts, before their surfaces to be opposed to the magnetic disk 100 are ground. The magnetic head 10 is ground to a larger extent in comparison with the magnetic head 20, so that the recording/reproduction gap depth 32 and the erasing gap depth 34 of the magnetic core block 11 are smaller than the recording/reproduction gap depth 42 and the erasing gap depth 44 of the magnetic core block 21.

Resolution and overwrite characteristics with respect to changes in the recording/reproduction gap depths 32 and 42 will be described below with reference to FIGS. 5 and 6.

Figure 5:
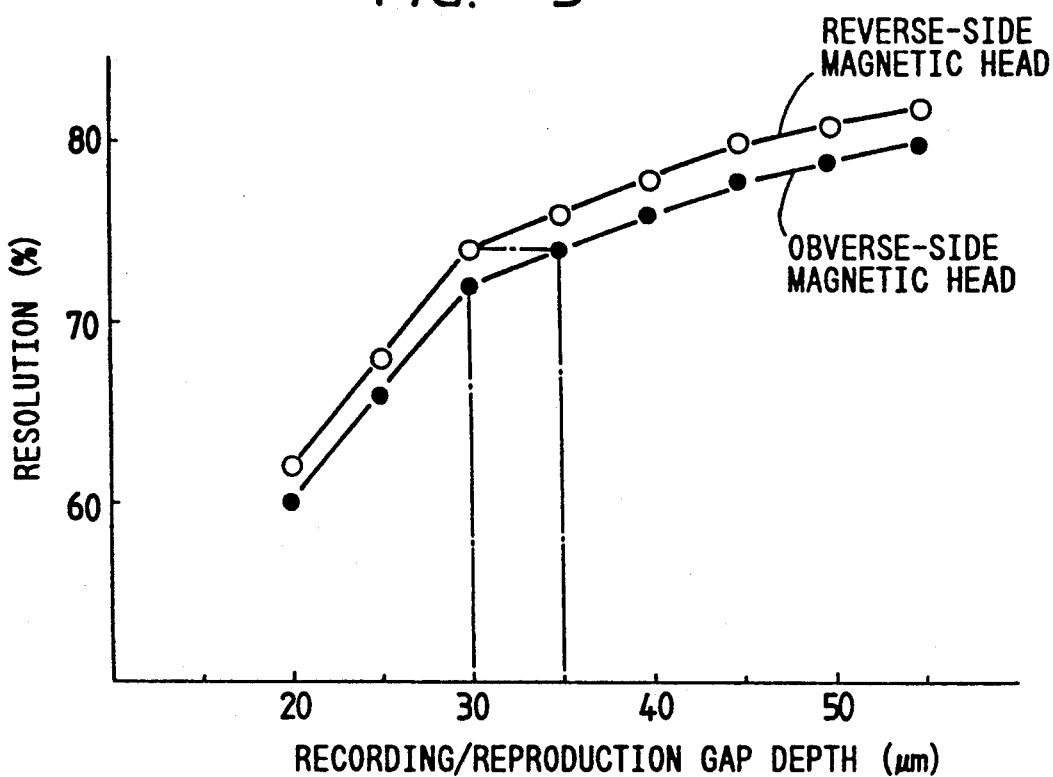
FIG. 5 is a graph of the resolution with respect to changes in the recording/reproduction gap depths of the magnetic head assembly in accordance with the embodiment of the present invention.

FIG. 5 is a graph of experimental data showing changes in resolution characteristics of the magnetic head 10 on the reverse side of the magnetic disk 100 and the magnetic head 20 on the obverse side of the magnetic disk 100 when the recording/reproduction gap depths 32 and 42 are changed from 20 to 55 $\mu$m.

Figure 6:
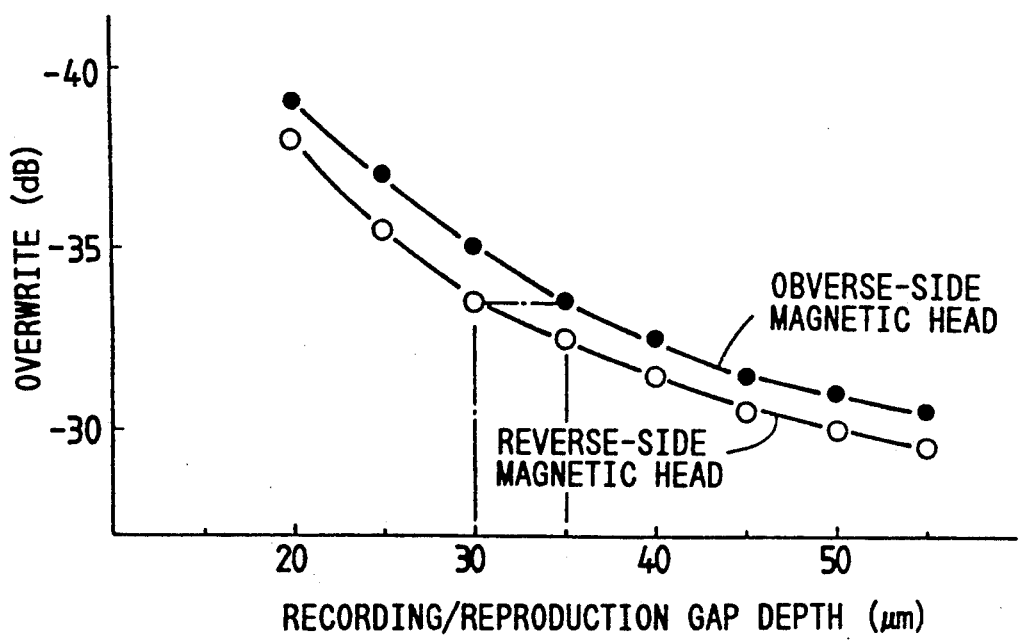
FIG. 6 is a graph of the overwrite level with respect to changes in the recording/reproduction gap depths of the magnetic head assembly in accordance with the embodiment of the present invention.

FIG. 6 is a graph of experimental data showing changes in overwrite characteristics of the magnetic head 10 on the reverse side of the magnetic disk 100 and the magnetic head 20 on the obverse side of the magnetic disk 100 when the recording/reproduction gap depths 32 and 42 are changed from 20 to 55 $\mu$m.

Referring to FIG. 5, the recording/reproduction gap depth 32 of the reverse-side magnetic head 10 at which the resolution is 74% is 30 $\mu$m, while the recording/reproduction gap depth 42 of the obverse-side magnetic head 20 at which the resolution is 74% is 35 $\mu$m.

Referring to FIG. 6, the overwrite level of the reverse-side magnetic head 10 when the recording/reproduction gap depth 32 is 30 $\mu$m is $-33.5$ dB, and the recording/reproduction gap depth 42 when the overwrite level of the obverse-side magnetic head 20 is $-33.5$ dB is 35 $\mu$m.

Thus, as can be understood from FIGS. 5 and 6, the recording/reproduction gap depth of the reverse-side magnetic head 10 and the recording/reproduction gap depth of the obverse-side magnetic head 20 may be set to 30 $\mu$m and 35 $\mu$m, respectively, to equalize the two magnetic heads in resolution and overwrite level and to enable one circuit to process signals from the two magnetic heads.

A case of setting the recording/reproduction gap depths 32 and 42 to 30 $\mu$m and 35 $\mu$m, respectively described above. However, the recording/reproduction gap depths 32 and 42 can be freely set in accordance with the required characteristics of the magnetic heads. In any case, the magnetic characteristics of the two magnetic heads can be equalized by setting the recording/reproduction gap depth 42 of the obverse-side magnetic head 20 to a value greater than the recording/reproduction gap depth 32 of the reverse-side magnetic head 10, as is apparent from FIGS. 5 and 6.

As described above, in the magnetic head assembly in accordance with the present invention, the recording/reproduction gaps of the two magnetic core blocks are formed so that the recording/reproduction gap depth of one of the magnetic core blocks closer to the center of rotation of the magnetic disk is larger than the recording/reproduction gap depth of the other magnetic core block, thereby equalizing the magnetic characteristics of the magnetic heads on the two sides of the magnetic disk. It is thereby possible to process signal from the two magnetic heads by a common circuit, and to form the same magnetic head parts before the magnetic head surfaces to be opposed to the magnetic disk are ground. Thus, a magnetic head assembly having two magnetic heads which can be manufactured at a reduced cost if only the extent of grinding is changed can be provided.

What is claimed is:

1. A magnetic head assembly comprising a pair of magnetic heads respectively disposed on two sides of a magnetic disk, respective core blocks of said magnetic heads being set at different distances from the center of rotation of the magnetic disk, wherein recording/reproduction gaps of said pair of magnetic core blocks are formed so that the depth of the recording/reproduction gap of one of said magnetic core blocks closer to the center of rotation of the magnetic disk is larger than the depth of the recording/reproduction gap of the other of said magnetic core blocks.

* * * * *